(12) United States Patent
Numrich et al.

(10) Patent No.: US 6,475,420 B1
(45) Date of Patent: Nov. 5, 2002

(54) PROCESS OF MAKING A GLOSSY FILM

(75) Inventors: Uwe Numrich, Weiterstadt (DE); Klaus Hofmann, Griesheim (DE); Peter Kaube, Rossdorf (DE); Horst Schmidt, Seeheim-Jugenheim (DE); Heinz Vetter, Rossdorf (DE)

(73) Assignee: Roehm GmbH, Darmstadt (DE)

( * ) Notice: Subject to any disclaimer, the term of this patent is extended or adjusted under 35 U.S.C. 154(b) by 0 days.

(21) Appl. No.: 09/555,900
(22) PCT Filed: Dec. 2, 1998
(86) PCT No.: PCT/EP98/07749
§ 371 (c)(1),
(2), (4) Date: Aug. 10, 2000
(87) PCT Pub. No.: WO99/29766
PCT Pub. Date: Jul. 17, 1999

(30) Foreign Application Priority Data

Dec. 5, 1997 (DE) .......................................... 197 53 972
Mar. 25, 1998 (DE) .......................................... 198 13 001

(51) Int. Cl.$^7$ ............................................... B29C 47/90
(52) U.S. Cl. .................................. 264/211.12; 264/280
(58) Field of Search .......................... 264/211.12, 280, 264/284

(56) References Cited

U.S. PATENT DOCUMENTS 4,707,396 A * 11/1987 Wank et al. ................. 428/216

FOREIGN PATENT DOCUMENTS

| DE | 19544563 A1 | * | 6/1997 |
| EP | 0298208 A1 | * | 1/1989 |
| EP | 0454520 A1 | * | 10/1991 |
| EP | 0847842 A2 | * | 6/1998 |
| GB | 2080199 A | * | 2/1982 |
| JP | 02215511 A | * | 8/1990 |

* cited by examiner

Primary Examiner—Leo B. Tentoni
(74) Attorney, Agent, or Firm—Oblon, Spivak, McClelland, Maier & Neustadt, P.C.

(57) ABSTRACT

An impact resistant provided PMMA moulding material according to DE 195 44 563 is process into a surface-hardened film which is highly glossy, essentially free of gel bodies and can be processed in the "in-mould-film-decoration" method. The melted mass is generated by means of an extruder and fed to the inventive glazing rolls via a flexible lip nozzle, saild rolls being configured in order to generate an especially high locking pressure in the roll slit. The smoothing rolls are cambered. The films are used for decorating surfaces of high-value thermoplastic moulded parts.

14 Claims, 3 Drawing Sheets

PROCESS OF MAKING A GLOSSY FILM

FIELD OF THE INVENTION

To decorate injection-molded shaped parts with printed polymethyl methacrylate films (PMMA) there are used PMMA films with thicknesses in the range between 80 and 300 μm for the purpose of achieving a certain "depth effect" of the printing. For decoration, either printed PMMA films colaminated with thermoplastic laminate substrates are preformed and stamped to the desired geometry then placed in the injection-molding die and back-molded, or printed PMMA film in the form of rolled stock is guided into an injection-molding die and back-molded.

Back-molding takes place on the printed side, so that the printing is protected by the PMMA film, which contains UV absorbers. Examples of materials for use in back-molding include the following thermoplastics and polymer blends: ABS, PC/ABS blends, PVC, PC, PC/ASA blends, PP, PP blends.

For decoration, either printed film-type formed parts (optionally preformed) are placed in the injection-molding die and back-molded, or printed PMMA film in the form of rolled stock is introduced into the injection-molding die and back-molded, or PMMA film is laminated onto a thermoplastic laminate substrate and (optionally preformed) placed in the injection-molding die and back-molded. As laminate substrates which can be laminated with the inventive and printed film, there can be used, for example, the following thermoplastics: ABS, polycarbonate-ABS blends, ASA (copolymers of acrylic ester, styrene and acrylonitrile), polycarbonate-ASA blends, polyolefins such as polyethylene and polypropylene, PVC and polyphenylene-containing blends. All thermoplastic materials can be reinforced by glass fibers or inorganic fillers.

The PMMA film assumes the function of a protective lacquer. In contrast to injection-molded parts which are protected with protective lacquer or which are directly printed or printed by transfer methods (thermal transfer, water-based transfer), surface decoration with printed PMMA films offers the following advantages:

- clear cost reduction (surface finish and decoration are achieved in one process step)
- solvent-free process
- no expensive capital spending and environmental directives
- simple change of the printed design
- greater design freedom The decoration of thermoplastic shaped parts with printed films concurrently with the injection-molding process is generally known as "in-mold film decoration". The best known form of this method is called "insert molding". For this purpose the decoratively printed PMMA film is stiffened by colamination with a thermoplastic laminate substrate. For this purpose there are preferably used ABS, ASA, PC, PVC, PP, PPE and blends of these materials.

The film laminate is formed and stamped to the desired geometry by means of a thermoforming process. The preforms are then fed to the back-molding process for actual manufacture of the shaped parts. For this purpose the preforms are placed in the injection-molding die, for the most part automatically, and back-molded with thermoplastic plastics. For back-molding there are preferably used ABS, ASA, PC, PVC, PP, PPE and blends of these materials. If the laminate substrate is used in sufficient thickness, there is no need for back-molding and the unformed, stamped or cut laminate can be used directly as the shaped part.

By virtue of the extremely streamlined process control and the possibility of rapid design change, "in-mold film decoration" offers the processers or manufacturers of shaped parts substitute options for more traditional, more complex methods.

For example, PMMA film printed with transparent elastic lacquers then back-molded with transparent thermoplastics can be used in extremely rational manner for the manufacture of automobile tail-light lenses. As the transparent thermoplastics there are preferably used PMMA molding compounds, SAN, polystyrene molding compounds, polycarbonate and PMMA/SAN blends.

This method offers the possibility of rapid design change without having to build new, costly multicomponent injection-molding dies. Moreover, the complex step of coloration of the PMMA molding compounds which are complex for multicomponent injection molding is obviated.

In this type of application, "in-mold film decoration" permits the manufacture of complete external parts for automobile bodies, which parts can optionally contain the tail-light lens as a functional surface.

In this application the PMMA film printed with transparent elastic lacquers can optionally be back-molded, prior to the process of manufacture of the shaped part, together with transparent, thermoplastic laminate substrates in order to increase stiffness for protection of the lacquer from the hot, pressurized, molten thermoplastic material used for back-molding.

A special embodiment of "in-mold film decoration" which operates very economically uses combined mechanical forming and back-molding dies, with which both mechanical forming of the films and back-molding take place in one process on the basis of printed films in the form of rolled stock. This method is generally known as "film-insert molding".

In the use of PMMA films for decoration of injection-molded shaped parts by means of "in-mold film decoration", exacting requirements are imposed on the PMMA film material:

- good ease of manipulation in the printing process, or in other words adequate extensibility
- high surface hardness (at least pencil hardness HB), to prevent scratching of the shaped part decorated with PMMA film
- high surface gloss of $\geq 120$ (measuring technique per DIN 67530)
- low haze development to less than 2% haze, corresponding to the method described on page 17
- low surface haze of <1.5%
- extremely low gel-body count of at most 1 gel body per 200 $cm^2$
- high weathering resistance; comparable with that of standard PMMA
- adequate absorption of UV light; UV absorption in the region between 290 and 370 nm <1%.

PRIOR ART

German Patent DE 3842796 (Röhm GmbH) describes PMMA films based on PMMA molding compounds with small-sized elastomer particles and high elastomer content. As regards the "surface hardness" parameter, the inventive films cannot be manufactured with these molding compounds.

International Patent WO 96/30435 and European Patent 763560 (Mitsubishi Rayon) describe the manufacture of PMMA films with thickness up to 0.3 mm on the basis of a specified PMMA composition: an impact-strength modifier based on polybutyl acrylate with specified particle diameter as well as PMMA matrix polymer III and the (optional) addition of a melt-strength modifier (polymer I).

The film is manufactured by means of a single-roll process (otherwise known as the chill-roll melt-casting process), in which the thermoplastic melt is brought into contact with a single metal roll and cooled during the cooling and solidification process. It is expressly pointed out that the thermoplastic melt for manufacture of films of the claimed thickness range cannot be formed between two metal rolls.

Compared with the two-roll process this method suffers from significant disadvantages, which have a decisive influence on film quality. In forming on the single chill roll, in contrast to the two-roll (smoothing) process, gel bodies, which in principle tend to be formed by impact-strength-modified PMMA molding compounds, are not forced underneath the film surface and thus remain visible as optical defects. This is particularly detrimental as regards the subsequent printing process for the manufacture of decorated films, in which clearly visible flaws are apparent in the region of the gel bodies. Furthermore, the film surface opposite the chill roll and cooling naturally in the air exhibits pronounced surface haze, which results from the differences between volume contraction of the elastomer particles and the PMMA matrix. Hereby there is produced a pronounced "peak-and-valley" surface structure, which scatters light and thus causes a detrimental haze effect.

German Patent DE 19544563 (Röhm GmbH) describes the impact-resistant PMMA molding compounds used to manufacture the inventive films.

German Patent DE 4018530 (Röhm GmbH) describes a method for manufacture of solid plates or films with thickness less than 1 mm from a thermoplastic plastic with a glass transition temperature above 50° C. Smoothing is achieved by guiding the film on an endless belt. The obtained plates or films are practically free of orientations and double refraction.

European Patent EP 659829 (Röhm GmbH) describes a weathering-protection film and thus coated shaped parts, wherein the film has the function not only of protecting against weathering but also absorbing UV radiation. It comprises a hard phase of PMMA and a tough phase, the UV absorber being contained in the hard phase.

European Patent 391193 (Bayer AG) describes a method for manufacture of optically isotropic extruded films which are glossy on both sides and have a thickness of less than 0.6 mm, and which either 1. are manufactured by extrusion and subsequent calendering between a lacquered elastic roll and a high-gloss steel roll or
2. are formed in two extrusion steps, the first step being production of a high-gloss film on the one side and a matt film on the other side by extrusion and subsequent calendering between a ground elastic roll and a high-gloss steel roll. In a second extrusion step the film produced in the first step is coated with the melt of the same thermoplastic plastic on the matt side of the film, and the resulting coated film is calendered once again between a high-gloss steel roll and a ground elastic roll, the high-gloss side of the coated film being directed toward the roll of ground elastic material.

The two methods, which not only are technologically complex but also incur extremely high production costs, take into consideration the current prior art, which considers the manufacture between two high-gloss steel rolls of films which are glossy on both sides to be unrealistic because of the extremely large forces, which are difficult to control, in the roll gap.

Method 1 suffers from the disadvantage that it cannot be achieved on a large industrial scale, since the lacquer layers on the rubber rolls become brittle very rapidly under the influence of the high melting temperature. To reduce the influence of the high melting temperatures, the lacquered rubber rolls can be cooled in a water bath, but the moisture leads to a detrimental influence on the surface quality of the film.

Method 2 is extremely unfavorable from the economic viewpoint, since the film must be manufactured in two extrusion steps. Furthermore, the extrusion coating of a film with melt and the subsequent calendering, especially in the thickness range claimed according to the invention, leads to unfavorable surface characteristics.

European Patent 195075 (Exxon) describes a method for manufacture of a film comprising 10 to 85 wt % of an elastomer and 90 to 15 wt % of a polyolefin, wherein the extruded web is passed through the gap between contra-rotating rolls at a temperature above its softening point. One of the rolls is a high-gloss chill roll and the other roll is a roll with a high-gloss rubber surface, thus cooling the film.

The films obtained in this way have a thickness of between 25 and 250 microns ($10^{-6}$ m). Locking forces are not described, and the disadvantages cited in the discussion of European Patent EP 391193 exist here also.

European Patent 212355 (Bayer AG) describes a polycarbonate film which is printed if necessary with an adhesive-free polyurethane layer. The films are matted on one side or structured on one side by drawing them over a matted or structured chill roll. The films obtained in this way are printed and back-molded. A copolymer of acrylonitrile, butadiene and styrene is used as the plastic for back-molding.

European Patent EP 294705 (Röhm GmbH) describes a method for the manufacture of films smoothed on both sides, which method uses as a smoothing element an already smoothed film produced previously in the method and recycled.

A. Huemer (Kunststoffe, 87 (1997), 10, pp. 1351 ff.) discusses the advantages and disadvantages of glazing rolls, as does H. Gross in Kunststoffe 87 (1997), 5, p. 564.

Huemer states that "Experiments with relatively high pressure per unit length fail, because thereby neither the dwell time in the roll gap nor the relaxation time in the polymer changes."

The measures described by Huemer (correct ratio of nozzle outlet velocity and drawdown velocity) are not sufficient to obtain films with high surface quality. Contrary to Huemer's observation, it is not the lowest possible but instead the highest possible pressure per unit length in the roll gap that is necessary to smooth the surface.

OBJECT AND ACHIEVEMENT

The need therefore existed to provide an economically operating method for manufacturing films with thicknesses of ≦0.3 mm from impact-resistant PMMA molding compounds, which method can be manipulated on a large industrial scale and which also ensures a surface quality that is highly glossy on both sides, is almost free of gel bodies and has surface hardness adequate for decorative applications. Furthermore, the film must be reliably and economically manipulable in the printing process as well as during the "in-mold decoration" process, and accordingly it must have excellent extensibility.

Thus extreme value had to be placed on proper selection of the PMMA components, especially as regards the balance between surface hardness and extensibility.

Figure 1:
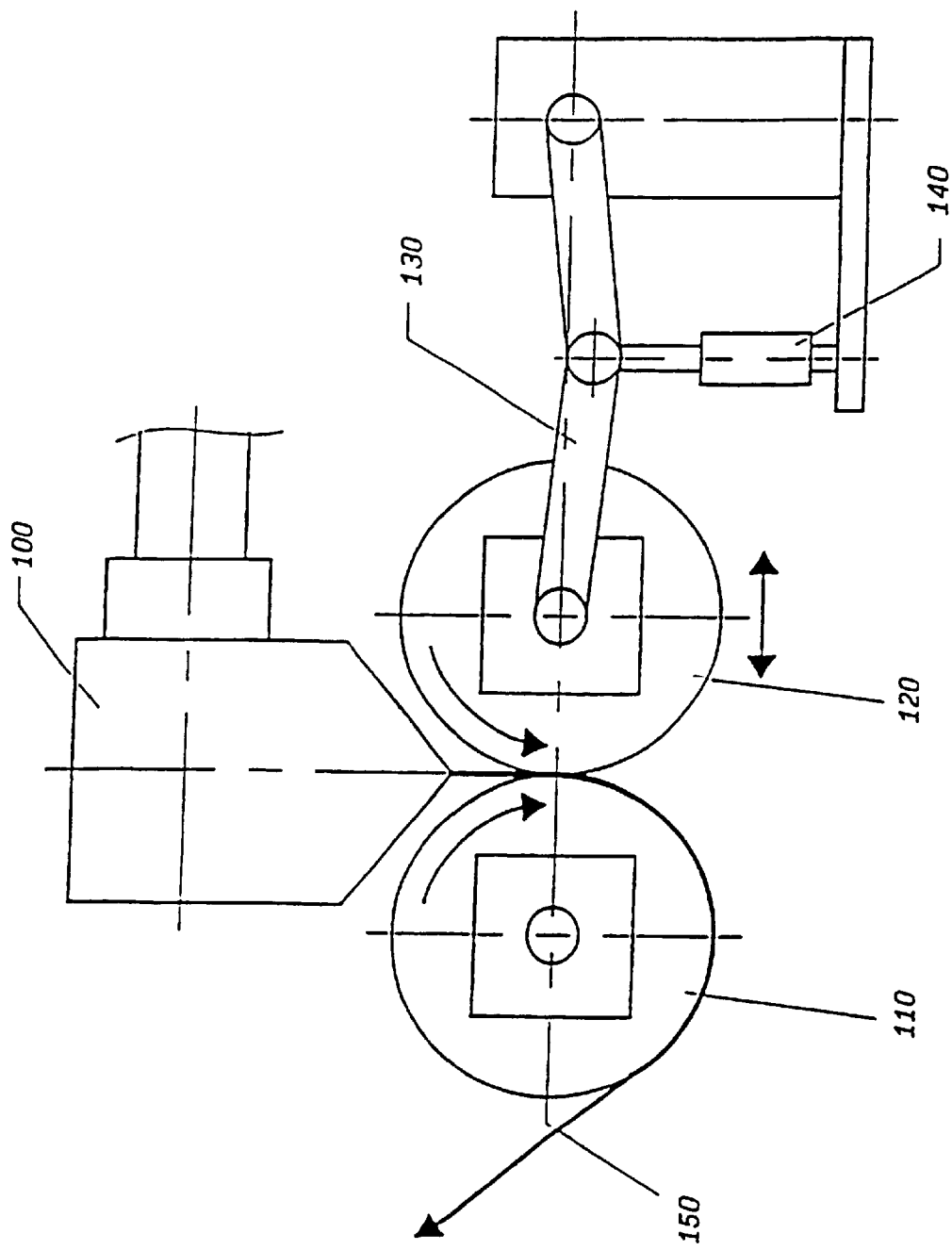
FIG. 1 shows an apparatus having glazing rolls with toggle-lever locking.

The PMMA film characteristics described hereinafter and necessary for surface decoration applications can be achieved only if:

- weathering-resistant impact-strength modifiers based on polybutyl acrylate are used
- the impact-strength modifier used has a certain minimum particle size of the effective elastomer phase (particle-size range)
- the impact-strength modifier used can be employed in relatively high dilution by virtue of favorable morphological structure (clean separation of tough and elastomer phase, highest possible effective elastomer content, largest possible particle size), thus ensuring the minimum necessary surface hardness.
- a special molding-compound manufacturing method is used for manufacture of the film raw material, which method, by virtue of the integrated technique for coagulation of impact-strength modifiers, permits adequate separation of water-soluble polymerization auxiliaries used in the production of the impact-strength modifier, thus ensuring only slight hazing tendency of the film under the effect of water vapor.
- good manipulability in the printing process (usually decoratively printed PMMA films are used for "film insert molding"), or in other words adequate extensibility
- high surface hardness (at least pencil hardness HB), to prevent scratching of the shaped part decorated with PMMA film
- high surface gloss (measuring technique per DIN 67530, $\geq 120$)
- low haze development to less than 2% haze, corresponding to the method described on page 17
- low surface haze of <1.5%
- extremely low gel-body count of at most 1 gel body per 200 cm$^2$
- high weathering resistance; comparable with that of standard PMMA
- adequate absorption of UV light; UV absorption in the region between 200 and 370 nm <1%.

The manufacture of the impact-resistant PMMA molding compounds used is described in German Patent 19544563 (Röhm GmbH).

Furthermore, the film-forming method according to the invention is necessary in order to ensure high film quality (extremely low gel-body count, high surface gloss, high weathering resistance, low surface haze). The combination of characteristics cited hereinabove is not possible with the chill-roll method conventionally used to manufacture films in the claimed thickness range.

The inventive film is manufactured with a special forming method based on glazing-roll technology, using a special locking system and a specially cambered steel-roll pair with mirror-like high-gloss polish, in the roll gap of which pair there is achieved forming of the inventive films. Heretofore only much thicker films have been manufactured by glazing-roll technology (d>0.3 mm; see "Films for thermoformed packagings", VDI-Verlag, 1992).

To manufacture the inventive films (thickness range 80 to 300 μm, preferably 95 to 250 μm, especially preferably 105 to 250 μm) there are required extremely large locking forces in the roll gap. It has not been possible to achieve such forces with the designs used heretofore (toggle-lever locking, see FIG. 1, or conventional hydraulic locking). Hydraulic locking intended to apply such large locking forces even only approximately is much more complex from the design viewpoint than the inventive solution. Production of the large locking forces is achieved in surprising manner by the inventive design: Of the rolls constituting the smoothing gap, one is fixed immovably in the glazing-roll stand. The second, movable roll is positioned on the roll bearings by two parallel-mounted drives (electric or hydraulic) with worm gears, connected with thrust rods (see FIG. 2).

In this way, as regards the desired gap between the rolls, opening of the roll gap due to pressure caused by the melt is prevented. The maximum locking pressure achievable therewith is 1500 N/cm.

The melt produced by a single-screw or twin-screw extruder (melt pumps can be used optionally to ensure constant melt flow) is fed to the inventive forming method via a nozzle configured for film extrusion. The melt is dimensioned in the specified roll gap and is smoothed and cooled by the surface of the temperature-controlled rolls having mirror-like high-gloss polish (peak-to-valley height RA 0.002 to 0.006; RT=0.02 to 0.04, measured per DIN 4768). One or both rolls is or are ground to cambered geometry, thus deviating from cylindrical shape. The camber amounts to 0.1 to 0.2 mm relative to the diameter of the roll. This camber is of decisive importance for uniform thickness distribution over the width of the film.

Definition of "Camber":

Parabolic increase of diameter from the roll rims to the center. Literature reference: Hensen, Knappe, Patente, Plastic Extrusion Technology II, Extrusion Machines, Hanser-Verlag, 1986. The camber must be adapted to the film thickness and width to be obtained (in other words, there is no universally usable camber).

Alternatively, the following design features can be adopted to ensure uniform thickness distribution:

- crossing of roll axes ("ax crossing")
- counter-bending of rolls ("roll bending")

These two methods are unusual for glazing rolls, since they represent great design complexity here. They are normally used in calender systems.

As a result of the inventive method, there is obtained a film with excellent surface characteristics, which film is highly glossy on both sides and is almost free of gel bodies.

The inventive method can also be used for the manufacture of polycarbonate films with excellent surface characteristics.

In the two-roll process, the elastomer-modified PMMA melt is formed between two temperature-controlled steel rolls, the surface temperature of which is below the glass transition temperature of the PMMA matrix polymers used. Hereby there is obtained a preferential orientation (possessing much greater hardening tendency compared with the elastomer phase) of the PMMA matrix molecules at the metal or film surface, whereby there is achieved a highly glossy film surface with negligibly low surface haze, The two-roll process also ensures much better weathering behavior, since a smooth film surface is less sensitive to erosion induced by UV light.

Certainly a film surface that is highly glossy on both sides can be achieved even by means of the chill-roll process, by choosing modifier components of extremely small particle sizes (as described in German Patent DE 3842796). Nevertheless, this exhibits the gel-body formation which is typical of PMMA films manufactured by the chill-roll process but is detrimental for surface decoration.

Furthermore, to ensure adequate film extensibility as the elastomer particle size decreases, an increasing elastomer concentration is necessary. This in turn has a detrimental effect on the surface hardness that is essential for decoration applications (the minimum requirement is pencil hardness "HB", preferably at least H, especially preferably at least 2H).

The optimal forming temperature range for thermoplastic noncrystalline plastics lies variously between the glass transition temperature (ET) and the region of plastic viscous flow. To achieve high surface gloss, the surface temperatures of the smoothing-forming rolls must be adjusted to a value below the glass transition temperature during the smoothing process. Consequently films comprising thermoplastic materials become progressively more difficult to form to thin layers the greater the temperature difference between roll temperature (which must be below $T_G$) and the optimum hot-forming temperature range.

As is evident from FIG. 99 on page 166 of H. Saechtling, Plastics Textbook, 21st Edition (1979), the hot forming of thin films with highly glossy surfaces is much more difficult, by virtue of the circumstances described hereinabove, in the case of polycarbonate than in the case of polymethyl methacrylate. Consequently the minimum thickness achievable with the smoothing process used is about 120 μm in the case of polycarbonate extrusion and about 100 μm in the case of PMMA. The required locking forces increase exponentially with decreasing thickness.

Furthermore, for thermoplastic materials, film forming with the claimed smoothing process becomes progressively simpler to configure as the temperature range for optimal hot forming becomes broader. Since a steep temperature gradient is developed in the melt film to be formed as it passes through the smoothing gap, the thermoplastic to be formed must have a reasonably broad hot-forming temperature range. Consequently it would hardly be possible to process thermoplastics such as PP or PE to the claimed films.

Test Methods

Modulus of elasticity, tensile strength and elongation at break were tested per ISO 527-3, using a distance between grips of 60 mm and an elongation rate of 50 mm/min.

The pencil hardness was tested per ASTM D 3363-92a.

The glossiness was measured at 60° per DIN 67530.

The haze was measured per ASTM D 1003. For calculation of the surface haze, the film haze following treatment of both sides with silicone oil was subtracted from the haze measured in the untreated condition.

The gel-body count was determined by a method used in-house at Röhm (Quality Assurance Working Instruction 1/021/220).

Gel bodies are particles which can be recognized by means of magnification and which flicker from dark to bright when the specimen is moved forward and back. They are mainly high molecular weight constituents that cannot be broken up during the melting process or, as in the case of impact-strength-modified PMMA, for example, are caused by aggregation of elastomer particles of the impact-strength modifier component.

The gel bodies are counted on a film area of 200 cm² using a "Copea CP-3" particle counter of Agfa Gaevert.

Haze After the Effect of Moisture:

The films are placed over water heated to 60° C. (90% relative humidity) for 96 hours. Thereafter the haze is measured per ASTM D 1003.

EXAMPLES

The manufacture of the impact-resistant molding compounds used and composition thereof are described in German Patent 19544563 (Röhm GmbH).

Raw Materials Used:

Latex dispersion of impact-strength-modified components: emulsion polymer built up in three stages with the following composition:

1st stage: copolymer of methyl methacrylate, ethyl acrylate and allyl methacrylate=95.7/4.0/0.3 (parts by weight)

2nd stage: copolymer of butyl acrylate, styrene and allyl methacrylate=82/17/1 (parts by weight)

3rd stage: copolymer of methyl methacrylate and ethyl acrylate=96/4

The weight ratio of the 3rd stage is 23/40/30 (parts by weight). The latex dispersion has a solids content of 45% (wt %).

Matrix polymer 1: synthesized by continuous bulk polymerization, average molecular weight (weight-average)=110,000 daltons. Copolymer of 96 wt % methyl methacrylate and 4 wt % methyl acrylate.

Matrix polymer 2: synthesized by batch polymerization, copolymer of 80 wt % methyl methacrylate and 20 wt % butyl acrylate. Molecular weight (weight-average): 270,00 daltons.

Matrix polymer 3: synthesized by continuous bulk polymerization. Average molecular weight (weight-average)= 110,000 daltons. Copolymer of 99 wt % methyl methacrylate and 1 wt % methyl acrylate.

Manufacture of the Impact-resistant PMMA Molding Compounds Used as Basis for Examples 1, 2 and 4

The impact-resistant PMMA molding compounds used as basis in Examples 1, 2 and 4 were manufactured in two steps. In the first step, an impact-resistant molding-compound intermediate was manufactured by means of a combined coagulation/compounding installation. In the second step, this molding-compound intermediate was mixed in a twin-screw compounder with "matrix polymer 2" to obtain the final film raw material. The mixing ratio of molding-compound intermediate to matrix polymer 2 was 1:1, and 0.3 wt % of Tinuvin P (benzotriazole-base UV absorber, manufactured by Ciba-Geigy) was added during compounding.

Step 1 takes place in one of two extruders connected in series in the existing installation. In the first extruder the latex dispersion is dewatered and united with part of "matrix polymer 1", which is supplied as melt. In the second extruder, which functions as the compounding and outgassing extruder, the main quantity of matrix polymer 1 is added via a lateral charging unit. Optical brighteners and a yellowing stabilizer are added via a master batch at the end of the outgassing zone. The proportions introduced comprise, relative to the manufactured molding-compound intermediate, 4 ppm Ultramarine Blue 31, 14 ppm Ultramarine Violet 11 and, as yellowing stabilizer, 40 ppm sodium hypophosphite. The weight ratio of dispersion to matrix polymer is 82 to 63 parts.

Manufacture of the Impact-resistant PMMA Molding Compound Used as Basis for Example 3

The impact-resistant PMMA molding compound used as basis for Example 3 is manufactured by means of a combined coagulation-compounding installation comprising two extruders connected in series. In the first step the latex dispersion is dewatered and united with part of "matrix polymer 2", which is supplied as melt. In the second extruder, which functions as the compounding and outgassing extruder, the remaining quantity of matrix polymer 2 is added via a lateral charging unit. Optical brighteners, yellowing stabilizer and UV absorbers are added via a master batch at the end of the outgassing zone. The proportions introduced comprise, relative to the manufactured molding compound, 4 ppm Ultramarine Blue 31, 14 ppm Ultramarine Violet 11, 40 ppm sodium hypophosphite and 0.5 wt % Mark LA 31 (benzotriazole-base UV absorber, manufactured by Asahi-Denka). The weight ratio of dispersion to matrix polymer is 42/81 parts.

Manufacture of the Films of Examples 1 and 3 (According to the Invention)

The melt is produced by means of a 120 mm Ø single-screw extruder and fed to the inventive glazing rolls via a flexible-lip nozzle (1500 mm wide) configured for film extrusion. The initial setting of the nozzle-lip gap is 0.8 mm.

Figure 2:
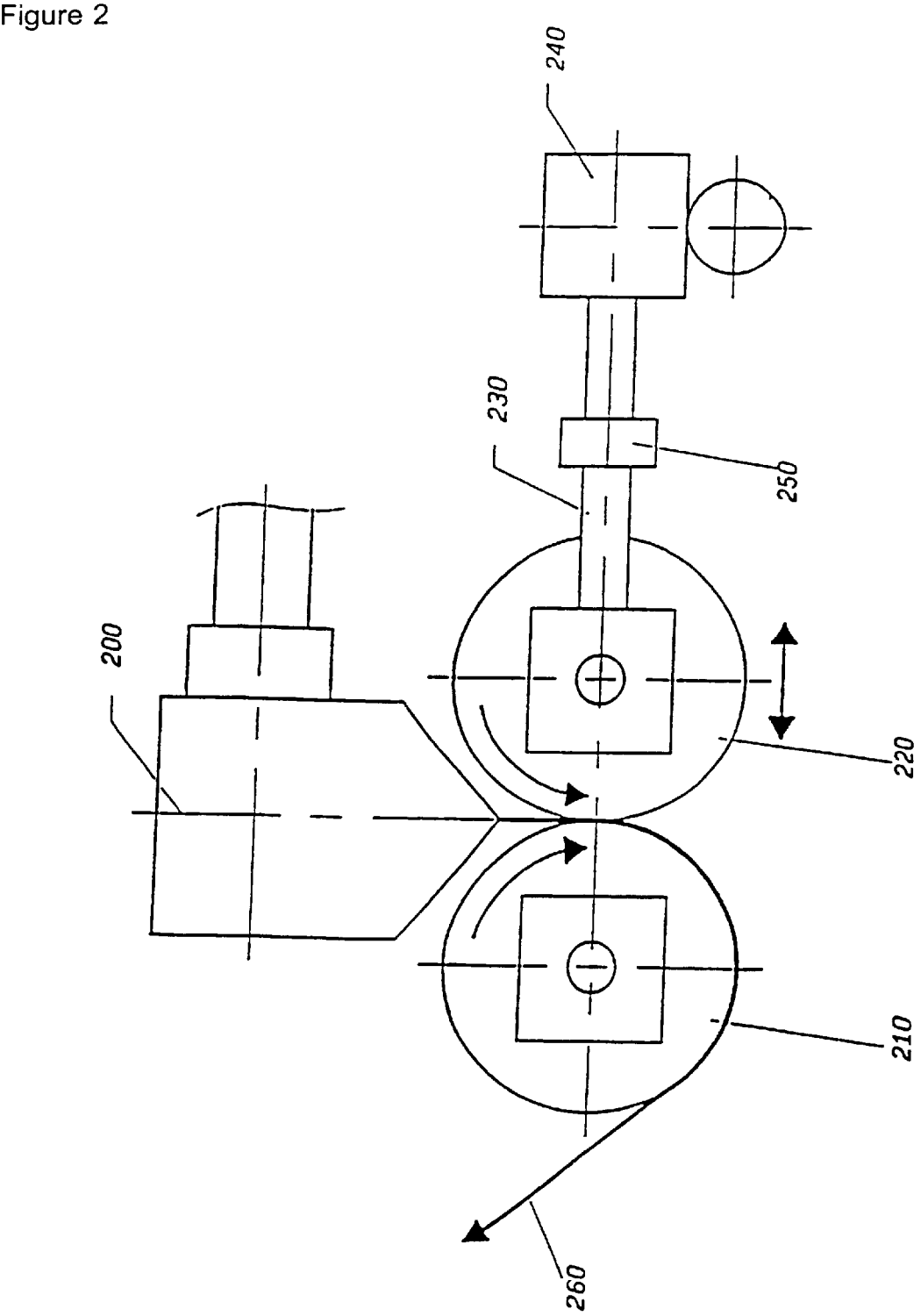
FIG. 2 shows an apparatus having a movable and a fixed glazing roll.

According to the invention, the glazing rolls are configured by special design for generation of large locking forces in the roll gap (see FIG. 2).

Of the rolls constituting the smoothing gap, one is fixed immovably in the calender stand. The movable roll is positioned on the bearings of the rolls by two parallel-mounted electric drives with worm gears, connected with thrust rods. In this way, by means of the generated locking force of 1500 N/cm, opening of the roll gap during the manufacture of the 0.125 mm thick film due to pressure caused by the cooling melt is prevented. The melt is dimensioned in the roll gap and is smoothed and cooled by the surface of the rolls having mirror-like high-gloss polish (peak-to-valley height RA=0.004), these rolls being temperature-controlled to below the glass transition temperature of the PMMA matrix polymers. One of these two rolls is cambered. The camber amounts to 0.1 mm.

As a result, there is obtained a film with very low surface haze, which film is highly glossy on both sides and is free of gel bodies. The films are printed in the desired design and then processed to the desired, decorated shaped part by "in-mold film decoration".

Manufacture of the Film of Example 2 (Comparison Example, Chill-roll Method Analogous to the Cited European Patent No. EP 763560 of Mitsubishi)

The melt is produced by means of a 120 mm Ø single-screw extruder and fed to a chill-roll film-forming system via a flexible-lip nozzle with 1500 mm width, configured for film extrusion. The initial setting of the nozzle-lip gap is 0.8 mm.

The melt film is placed against the surface of the cooled chill roll and cooled. As a result, there is obtained film which, by comparison with the films manufactured according to the invention, has relatively low surface gloss, high gel-body count, low brilliance and significant surface haze (see Table 1).

Manufacture of the Film of Example 4 (Comparison Example, Glazing Rolls With Toggle-lever Locking, See FIG. No. 1)

The melt is produced by means of a 120 mm Ø single-screw extruder and fed to glazing rolls equipped with toggle-lever locking via a flexible-lip nozzle with 1500 mm width, configured for film extrusion. The initial setting of the nozzle-lip gap is 0.8 mm.

As a result there is obtained a product having surface characteristics corresponding to those of the films of Examples 1 and 3. However, the desired film thickness of ≦300 μm is not achieved with the toggle-lever locking system. Because the joint necessarily is not fully extended in the closed condition (a completely extended joint under load would require an infinitely large opening force), this locking system does not have the rigidity necessary to bring about the required extremely large locking force. This is of decisive importance in view of the large opposing forces (exerted by the thin melt film during film manufacture).

Example 5

Lamination with a Thermoplastic Laminate Substrate of the PMMA Films Manufactured According to the Invention in Examples 1 and 3

An ABS melt film is produced by means of a 90 mm Ø single-screw extruder and fed to glazing rolls via a broad-slit nozzle. The initial setting of the nozzle-lip gap is 1.2 mm.

At the smoothing gap, the inventive PMMA film, printed with a "carbon design" for example, and a cover lacquer imparting adhesion to ABS, is laminated with the ABS melt film, the temperature of which is 240° C. The inventive PMMA film is suspended on a brake-controlled winding shaft. To ensure wrinkle-free infeed and proper lamination, the inventive plexiglass film is guided over an "expander roll".

The resulting film laminate has a total thickness of 0.50 mm, of which 125 μm is formed by the PMMA layer. The drawdown velocity from the glazing rolls is 5 m/min. The composite film is used for surface decoration of injection-molded shaped parts by means of the "insert-molding" process. The resulting injection-molded parts have an attractive surface design by virtue of the decorative print used. By virtue of its high-quality surface characteristics, the PMMA film represents the ideal substrate for high-quality lacquer systems.

TABLE 1

| | Characteristic | Modulus of elasticity [MPa] | Tensile strength [MPa] | Elongation at break [%] | Pencil hardness | Glossiness at 60° | Surface haze [%] | Gel bodies per 200 cm² |
|---|---|---|---|---|---|---|---|---|
| Example No. | 1* | 1591 | 61 | 8 | 1 H | 133 | 1.1 | 0 |
| | 2 | 1603 | 67 | 7 | F | 108 | 2.1 | 15 |
| | 3* | 1530 | 83 | 7 | 2 H | 139 | 0.7 | 0–1 |
| | 4 | Claimed thickness not possible | | | | | | |

*According to the invention

List of Reference Numerals

Figure 3:
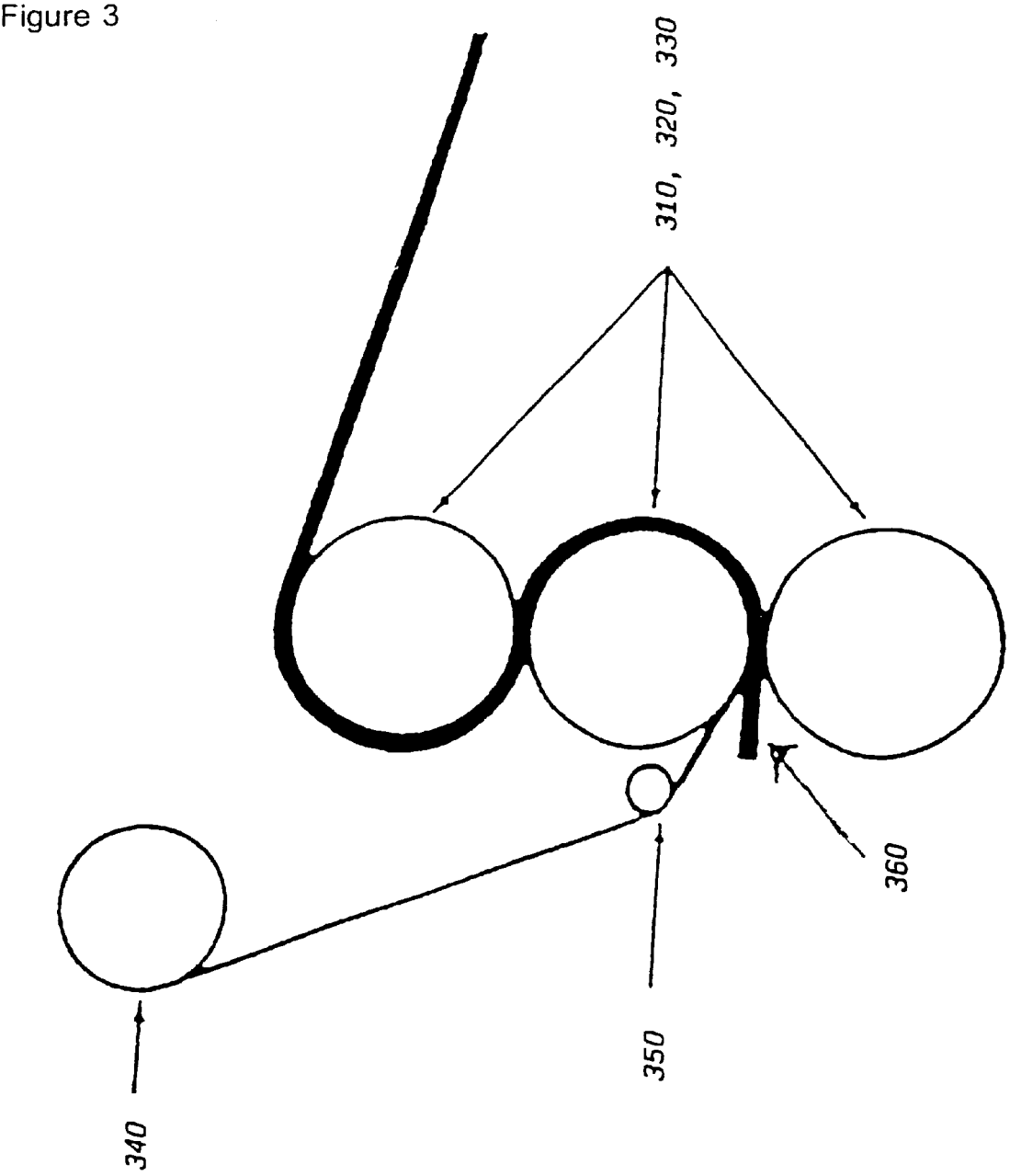
FIG. 3 shows schematically the arrangement of glazing rolls and PMMA film.

FIG. 1
100 Flexible-lip nozzle
110 Fixed roll
120 Movable roll
139 Toggle lever
140 Pneumatic cylinder
150 Film FIG. 2
200 Flexible-lip nozzle
210 Fixed roll
220 Movable roll
230 Thrust rod
240 Worm gear
250 Pressure-measuring cell
260 Film FIG. 3
310 Roll of the glazing rolls
320 Roll of the glazing rolls
330 Roll of the glazing rolls
340 PMMA film
350 Expander roll
360 Film

What is claimed is:

1. A method for manufacturing a film, comprising:
melting a thermoplastic molding material, thereby obtaining a melt;
feeding the melt to a roll gap between two glazing rolls;
generating a locking force in said roll gap;
shaping said melt in said roll gap to obtain a shaped melt;
smoothening and cooling said shaped melt,
thereby obtaining said film which is glossy on at least one side and which has a thickness in the range of 80 to 300 μm.

2. The method according to claim 1, wherein said locking force is 1500 N/cm.

3. The method according to claim 1, wherein said film is glossy on both sides; and
wherein a temperature range of the thermoplastic molding material for optimal hot forming is at least 15 K.

4. The method according to claim 3, wherein a temperature difference between a glass transition temperature of said thermoplastic molding material and said temperature range of the thermoplastic material for optimal hot-forming is at most 50 K.

5. The method according to claim 1, wherein said thermoplastic molding material is polymethyl methacrylate or polycarbonate.

6. The method according to claim 1, wherein one or both of said glazing rolls is cambered.

7. The method according to claim 1, wherein said film has a surface hardness of at least pencil hardness HB.

8. The method according to claim 1, wherein a surface gloss of said glossy side is ≧120.

9. The method according to claim 1, wherein a surface haze of said film is <1.5%.

10. The method according to claim 1, wherein a gel-body count of said film is not more than 1 gel body per 200 cm².

11. The method according to claim 1, wherein a UV-absorption of said film between 200 and 370 nm is <1%.

12. The method according to claim 1, wherein one of said two glazing rolls is fixed immovably in a glazing roll stand.

13. The method according to claim 1, wherein one of said two glazing rolls is movably positioned on roll bearings by two parallel mounted drives with worm gears, connected with thrust rods.

14. The method according to claim 6, wherein a camber is 0.1 to 0.2 mm relative to a diameter of the roll.

* * * * *